(12) United States Patent
Morita et al.

(10) Patent No.: US 10,253,143 B2
(45) Date of Patent: *Apr. 9, 2019

(54) FLUORORESIN FILM AND FLUORORESIN-LAMINATED ACRYLIC RESIN FILM

(75) Inventors: Kouji Morita, Settsu (JP); Yukihiro Shimamoto, Settsu (JP); Kazuhito Wada, Settsu (JP); Taizo Aoyama, Settsu (JP)

(73) Assignee: KANEKA CORPORATION, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/997,451

(22) PCT Filed: Jun. 10, 2009

(86) PCT No.: PCT/JP2009/060581
§ 371 (c)(1),
(2), (4) Date: Jan. 21, 2011

(87) PCT Pub. No.: WO2009/151071
PCT Pub. Date: Dec. 17, 2009

(65) Prior Publication Data
US 2011/0124816 A1    May 26, 2011

(30) Foreign Application Priority Data

Jun. 10, 2008 (JP) ................. 2008-152235
Mar. 2, 2009 (JP) ................. 2009-048121

(51) Int. Cl.
| | | |
|---|---|---|
| B32B 27/00 | (2006.01) |
| C08J 5/18 | (2006.01) |
| B32B 27/28 | (2006.01) |
| B32B 27/30 | (2006.01) |
| C08L 33/16 | (2006.01) |
| B32B 27/08 | (2006.01) |
| C08F 220/24 | (2006.01) |
| C08L 27/12 | (2006.01) |
| C08L 27/16 | (2006.01) |
| C08L 51/06 | (2006.01) |

(52) U.S. Cl.
CPC .............. *C08J 5/18* (2013.01); *B32B 27/08* (2013.01); *B32B 27/28* (2013.01); *B32B 27/30* (2013.01); *B32B 27/304* (2013.01); *B32B 27/308* (2013.01); *C08L 33/16* (2013.01); *B32B 2250/24* (2013.01); *B32B 2270/00* (2013.01); *B32B 2307/306* (2013.01); *B32B 2307/412* (2013.01); *B32B 2307/50* (2013.01); *B32B 2307/536* (2013.01); *B32B 2307/712* (2013.01); *B32B 2307/714* (2013.01); *B32B 2605/00* (2013.01); *B32B 2605/003* (2013.01); *C08F 220/24* (2013.01); *C08J 2333/16* (2013.01); *C08L 27/12* (2013.01); *C08L 27/16* (2013.01); *C08L 51/06* (2013.01); *Y10T 428/3154* (2015.04)

(58) Field of Classification Search
CPC ...... C08L 33/16; C08L 2666/02; B32B 27/28; B32B 27/30
USPC ..................... 428/212, 220, 421
See application file for complete search history.

(56) References Cited

U.S. PATENT DOCUMENTS

| | | | |
|---|---|---|---|
| 4,421,843 A | | 12/1983 | Hattori et al. |
| 4,593,974 A | * | 6/1986 | Yamamoto ............. B29D 11/00 385/141 |
| 4,852,982 A | * | 8/1989 | Yamamoto et al. ........... G02B 3/0012 359/652 |
| 5,034,460 A | * | 7/1991 | Nishioka ...................... 525/72 |
| 5,183,839 A | | 2/1993 | Aharoni |
| 6,489,417 B1 | | 12/2002 | Samukawa |
| 7,452,602 B2 | | 11/2008 | Wada et al. |
| 2003/0235773 A1 | * | 12/2003 | Skorokhod et al. ....... 430/111.1 |
| 2006/0110617 A1 | * | 5/2006 | Kitaike et al. ............... 428/522 |
| 2009/0072433 A1 | | 3/2009 | Wada et al. |

FOREIGN PATENT DOCUMENTS

| | | |
|---|---|---|
| EP | 0882746 A2 | 12/1998 |
| EP | 1908797 A1 | 4/2008 |
| JP | 57-187248 A | 11/1982 |
| JP | 59-015411 A | 1/1984 |
| JP | 60-248762 A | 12/1985 |
| JP | 2-051548 A | 2/1990 |
| JP | 3-157163 A | 7/1991 |
| JP | 5-024160 A | 2/1993 |
| JP | 5-050566 A | 3/1993 |
| JP | 6-080794 A | 3/1994 |
| JP | 7-126552 A | 5/1995 |
| JP | 7-241963 A | 9/1995 |
| JP | 8-027344 A | 1/1996 |
| JP | 11-034249 A | 2/1999 |
| JP | 11-174971 A | 7/1999 |
| JP | 2000-102950 A | 4/2000 |
| JP | 2003-26734 A | 1/2003 |

(Continued)

OTHER PUBLICATIONS

Jouannet et al., Polymer vol. 38, No. 20, 1997, pp. 5137-5147.*

(Continued)

*Primary Examiner* — Lawrence D Ferguson
(74) *Attorney, Agent, or Firm* — Westerman, Hattori, Daniels & Adrian, LLP

(57) ABSTRACT

An object of the present invention is to provide a novel monolayer and multilayer film that can be employed also for use in interior and exterior members of vehicles, and that have excellent transparency, surface hardness, chemical resistance, and stain resistance such as lactic acid resistance and sunscreen resistance. The present invention is directed to a fluororesin film formed with (C) a fluororesin comprising (B) a fluorinated (meth)acrylic resin that contains a fluorine-containing alkyl(meth)acrylate polymer component; and a fluororesin-laminated acrylic resin film, wherein the fluororesin film layer is laminated on at least one face of a film layer comprising (A) an acrylic resin.

6 Claims, No Drawings

(56) References Cited

FOREIGN PATENT DOCUMENTS

| JP | 2005-163003 | A  | 6/2005 |
|----|-------------|----|--------|
| JP | 2006-169375 | A  | 6/2006 |
| JP | 1798253     | A1 | 6/2007 |
| JP | 2008-49524  | A  | 3/2008 |
| WO | 2006/016618 | A1 | 2/2006 |

OTHER PUBLICATIONS

International Search Report of PCT/JP2009/060581, dated Sep. 15, 2009.
European Search Report dated May 30, 2011, issued in corresponding European Patent No. 10194853.7.
European Search Report dated Jul. 23, 2013, issued in corresponding European Patent Application No. 10194853.7.
U.S. Office Action dated May 23, 2013, issued in corresponding U.S. Appl. No. 13/034,022.
U.S. Office Action dated Nov. 6, 2013 issued in corresponding U.S. Appl. No. 13/034,022.
Extended European Search Report dated May 20, 2014, issued in European Patent Application No. 09762501.6 (5 pages).
U.S. Office Action dated Jun. 19, 2014, issued in related U.S. Appl. No. 13/034,022 (13 pages).
Japanese Office Action dated May 20, 2014, issued in counterpart Japanese Patent Application No. 2010-516865, w/ English translation (6 pages).
U.S. Office Actino dated Oct. 24, 2014, issued in related U.S. Appl. No. 13/034,022 (17 pages).
U.S. Notice of Allowance dated Mar. 26, 2015, issued in corresponding U.S. Appl. No. 13/034,022 (13 pages).

* cited by examiner

FLUORORESIN FILM AND FLUORORESIN-LAMINATED ACRYLIC RESIN FILM

TECHNICAL FIELD

The present invention relates to a fluororesin film, and a fluororesin-laminated acrylic resin film produced by laminating the resin.

BACKGROUND ART

In recent years, harmful substances discharged in steps of paint application and plating in formation of members for vehicles have been even more strictly controlled in view of environmental issues, and thus acrylic decoration films and protection films have especially attracted attention as alternatives of such substances and for use in protecting the members. These protection films and decoration films are used by attaching to the surface of a substrate; therefore, transparency so as to allow printing and pattern applied onto the surface of the substrate to look brilliant, and flex cracking resistance upon insert or in-mold molding are demanded.

Moreover, since a film itself is printed, it requires in addition to chemical resistance, stain resistance against lactic acid components contained in human sweat and fats and oils on skin as interior members of vehicles are frequently brought into contact with human hand, and also against sunscreens, for example, Coppertone (registered trademark) used during summer season and in hot region as problems of deterioration of the substrate increase due to adhesion of such stains on the interior members.

In order to satisfy these quality requirements, a multilayer film produced by coextrusion molding of a methacrylic resin composition with a fluororesin that is superior in weather resistance and chemical resistance, as well as an acrylic resin film subjected to a surface hard coating treatment with a fluororesin have drawn strong interest in market. In particular, a method in which a film laminated with a vinylidene fluoride based resin which is melt moldable as a fluororesin laminated on an acrylic resin is decorated on the surface of a plastic formed article as a paint application alternative has attracted attention.

However, a vinylidene fluoride based resin is a crystalline resin, and has a high crystallization speed; therefore, to achieve satisfactory transparency is very difficult. In these regards, thinning of the film (see Patent Document 1), mixing of a vinylidene fluoride resin with a methacryl resin (see Patent Document 2), control of molding conditions including extrusion molding temperature, discharge rate and residence time in the extruder in film processing (see Patent Document 3) were proposed. However, required transparency cannot be easily achieved according to these methods.

Additionally, according to vinylidene fluoride resins, it is also difficult to achieve surface strength as desired for the aforementioned use.

Although a method for obtaining a vinylidene fluoride resin film that is superior in transparency and surface smoothness by sandwiching with metal rolls adjusted to have an appropriate temperature was studied (see Patent Document 4), increase of the steps may result in requirement for new facilities or remodeling of preexisting facilities, whereby disadvantages in economic aspects may occur. Therefore, a method which enables to produce a vinylidene fluoride resin film in a more convenient manner has been desired.

PRIOR ART DOCUMENTS

Patent Documents

Patent Document 1: JP-A S57-187248
Patent Document 2: JP-A H05-50566
Patent Document 3: JP-A H06-80794
Patent Document 4: Pamphlet of International Publication No. WO2006/016618

DISCLOSURE OF THE INVENTION

Problems to be Solved by the Invention

Accordingly, an object of the present invention is to provide a novel monolayer and multilayer film that can be employed also for use in interior and exterior members of vehicles, and that have well balanced transparency, surface hardness, chemical resistance, and stain resistance to lactic acid components contained in human sweat and fats and oils on skin, and to sunscreens.

Means for Solving the Problems

In view of the foregoing circumstances, as a result of elaborate investigations, the present inventors successfully produced a novel fluororesin film that is superior in transparency, surface hardness, chemical resistance and stain resistance by using a fluorinated (meth)acrylic resin that contains a fluorine-containing alkyl(meth)acrylate component. Furthermore, the present inventors found that a fluororesin film in which a fluorinated (meth)acrylic resin that contains polyvinylidene fluoride admixed is used has in addition to the characteristics described above, also well balanced heat resistance.

Moreover, the present inventors also investigated development of a fluororesin-laminated film in which the fluorinated (meth)acrylic resin described above is used. By using the fluororesin containing a fluorinated (meth)acrylic resin, the present inventors succeeded in easily producing a laminate film of a fluororesin layer and an acrylic resin layer according to general processes such as coextrusion molding and the like. Thus obtained fluororesin-laminated acrylic resin film was found to exhibit well balanced superior transparency, surface hardness, chemical resistance, stain resistance and heat resistance even if a fluororesin layer having a thickness of not less than 1 μm is provided. In addition, it was also found that by specifying the acrylic resin composition that constitutes the acrylic resin layer, the fluororesin-laminated acrylic resin film exhibits also superior flex cracking resistance, flex whitening resistance required for being available for use in interior and exterior of vehicles. Accordingly, the present invention was accomplished.

More specifically, the present invention relates to a fluororesin film formed with (C) a fluororesin that contains (B) a fluorinated (meth)acrylic resin that contains a fluorine-containing alkyl(meth)acrylate polymer component.

In the fluororesin film of the present invention, the content of the fluorine-containing alkyl(meth)acrylate polymer component is preferably not less than 80% by weight relative to 100% by weight of the fluorinated (meth)acrylic resin (B).

In the fluororesin film of the present invention, the fluororesin (C) may contain a polyvinylidene fluoride.

In the fluororesin film of the present invention, the content of the polyvinylidene fluoride is preferably 0.1 to 10 parts by weight relative to 100 parts by weight of the fluorinated (meth)acrylic resin (B).

In the fluororesin film of the present invention, the fluorinated (meth)acrylic resin (B) preferably has a melt viscosity of 300 to 4,000 Pa·sec under a condition according to JIS K7199 including a die temperature of 220° C., a shear rate of 122 sec$^{-1}$ and a capillary die diameter of 1 mm.

The fluororesin-laminated acrylic resin film of the present invention is produced by laminating the fluororesin film layer of the present invention on at least one face of a film layer constituted with (A) an acrylic resin.

In the fluororesin-laminated acrylic resin film of the present invention, it is preferred that:

the acrylic resin (A) is an acrylic resin composition containing 5 to 100% by weight of (a-1) an acrylic elastic material graft copolymer and 0 to 95% by weight of (a-2) a methacrylic polymer, with the total amount of (a-1) and (a-2) being 100% by weight, in which:

the acrylic elastic material graft copolymer (a-1) is a copolymerization product of 95 to 15 parts by weight of (a-1b) a monomer mixture containing 50 to 100% by weight of a methacrylic acid alkyl ester and 0 to 50% by weight of an other copolymerizable vinyl-based monomer in the presence of 5 to 85 parts by weight of at least one layer of an acrylic acid ester type crosslinked elastic material prepared by polymerization of (a-1a) a monomer mixture containing 50 to 99.9% by weight of an acrylic acid alkyl ester, 0 to 49.9% by weight of an other copolymerizable vinyl-based monomer and 0.1 to 10% by weight of a polyfunctional monomer having at least two unconjugated double bonds per copolymerizable molecule, with the total amount of (a-1a) and (a-1b) being 100 parts by weight; and the methacrylic polymer (a-2) is a copolymerization product of a monomer mixture including 80 to 100% by weight of a methacrylic acid alkyl ester and 0 to 20% by weight of an other copolymerizable vinyl-based monomer.

In the fluororesin-laminated acrylic resin film of the present invention, the mean particle size d (nm) of the acrylic acid ester type crosslinked elastic material, and the amount w (% by weight) of the polyfunctional monomer having at least two unconjugated double bonds per the copolymerizable molecule preferably satisfies the relational expression: $0.02d \leq w \leq 0.06d$.

In the fluororesin-laminated acrylic resin film of the present invention, the reduced viscosity of a methyl ethyl ketone soluble fraction of the acrylic resin (A) is preferably 0.2 to 0.8 dl/g.

It is preferred that the fluororesin-laminated acrylic resin film of the present invention has a total thickness of 30 to 300 μm, and the fluororesin film layer has a thickness of 1 to 30 μm.

The formed article of the present invention is obtained by laminating the fluororesin film or the fluororesin-laminated acrylic resin film of the present invention.

Effects of the Invention

The fluororesin film and the fluororesin-laminated acrylic resin film of the present invention are superior in transparency, surface hardness, chemical resistance and stain resistance.

PREFERRED MODE FOR CARRYING OUT THE INVENTION

The fluororesin (C) in the present invention includes (B) a fluorinated (meth)acrylic resin that contains a fluorine-containing alkyl(meth)acrylate polymer component. The fluororesin film formed with the fluororesin (C) can exhibit transparency, surface hardness, chemical resistance, stain resistance to lactic acid, sunscreens, etc. The term "(meth)acryl" referred to herein means methacryl and/or acryl.

As the "fluorine-containing alkyl(meth)acrylate polymer component" referred to herein, a fluorine-containing alkyl (meth)acrylate (co)polymer, i.e., a fluorine-containing alkyl (meth)acrylate polymer and/or fluorine-containing alkyl (meth)acrylate copolymer may be used.

In light of the chemical resistance, the content of the fluorine-containing alkyl(meth)acrylate polymer component is preferably not less than 80% by weight, and more preferably not less than 90% by weight based on 100% by weight of the total weight of the fluorinated (meth)acrylic resin (B).

As the fluorine-containing alkyl(meth)acrylate polymer, a well-known one may be used, and specific examples thereof include poly(trifluoromethyl methacrylate), poly(2,2,2-trifluoroethyl acrylate), poly(2,2,2-trifluoroethyl methacrylate), poly(1,1,1,3,3,3-hexafluoro-2-propyl methacrylate), poly(1,1,1,3,3,3-hexafluoro-2-propyl methacrylate), polyperfluoroethylmethyl methacrylate, polyperfluoropropylmethyl acrylate, polyperfluoropropylmethyl methacrylate, polyperfluorobutylmethyl acrylate, polyperfluorobutylmethyl methacrylate, polyperfluoropentylmethyl acrylate, polyperfluoropentylmethyl methacrylate, polyperfluorohexylmethyl acrylate, polyperfluorohexylmethyl methacrylate, polyperfluoroheptylmethyl acrylate, polyperfluoroheptylmethyl methacrylate, polyperfluorooctylmethyl acrylate, polyperfluorooctylmethyl methacrylate, polyperfluorononylmethyl acrylate, polyperfluorononylmethyl methacrylate, polyperfluorodecylmethyl acrylate, polyperfluorodecylmethyl methacrylate, polyperfluoroundecylmethyl acrylate, polyperfluoroundecylmethyl methacrylate, polyperfluorododecylmethyl acrylate, polyperfluorododecylmethyl methacrylate, polyperfluorotridecylmethyl acrylate, polyperfluorotridecylmethyl methacrylate, polyperfluorotetradecylmethyl acrylate, polyperfluorotetradecylmethyl methacrylate, poly(2-(trifluoromethyl)ethyl acrylate), poly(2-(trifluoromethyl)ethyl methacrylate), poly(2-(perfluoroethyl)ethyl acrylate), poly(2-(perfluoroethyl)ethyl methacrylate), poly(2-(perfluoropropyl)ethyl acrylate), poly(2-(perfluoropropyl)ethyl methacrylate), poly(2-(perfluorobutyl)ethyl acrylate), poly(2-(perfluorobutyl)ethyl methacrylate), poly(2-(perfluoropentyl)ethyl acrylate), poly(2-(perfluoropentyl)ethyl methacrylate), poly(2-(perfluorohexyl)ethyl acrylate), poly(2-(perfluorohexyl)ethyl methacrylate), poly(2-(perfluoroheptyl)ethyl acrylate), poly(2-(perfluoroheptyl)ethyl methacrylate), poly(2-(perfluorooctyl)ethyl acrylate), poly(2-(perfluorooctyl)ethyl methacrylate), poly(2-(perfluorononyl)ethyl acrylate), poly(2-(perfluorononyl)ethyl methacrylate), poly((perfluorotridecyl)ethyl acrylate), poly(2-(perfluorotridecyl)ethyl methacrylate), poly(2-(perfluorotetradecyl)ethyl acrylate), poly(2-(perfluorotetradecyl)ethyl methacrylate), and the like.

Among these, in light of the transparency, and adhesiveness with acrylic resin (A) layer when formed into a film-formed product, poly(trifluoromethyl methacrylate), poly(2,2,2-trifluoroethyl acrylate), poly(2,2,2-trifluoroethyl methacrylate), poly(1,1,1,3,3,3-hexafluoro-2-propyl methacrylate), poly(1,1,1,3,3,3-hexafluoro-2-propyl methacrylate), poly(2-(trifluoromethyl)ethyl acrylate), and poly(2-(trifluoromethyl)ethyl methacrylate) are preferred.

The method for producing the fluorine-containing alkyl (meth)acrylate polymer is not particularly limited as long as it is a generally employed method, and a well-known emulsion polymerization method, an emulsification-suspension polymerization method, a suspension polymerization method, a bulk polymerization method or a solution polymerization method is applicable. It is preferred that a polymerizable monomer including a fluorine-containing alkyl (meth)acrylate, a dispersion stabilizer, and an oil soluble radical polymerization initiator and ion exchanged water are charged in a polymerization vessel, and the mixture is subjected to suspension polymerization under stirring.

Illustrative examples of the dispersion stabilizer include e.g., water-soluble polymers such as gelatin, methyl cellulose, hydroxyethyl cellulose, hydroxypropyl cellulose, carboxymethyl cellulose, polyethylene glycol, polyoxyethylene-polyoxypropylene block copolymer, polyacrylamide, polyacrylic acid, polyacrylic acid salt, sodium alginate and partially saponified polyvinyl alcohol, inorganic substances such as tricalcium phosphate, titanium oxide, calcium carbonate and silicon dioxide, and the like. Among these dispersion stabilizers, in particular, partially saponified polyvinyl alcohol, hydroxypropyl cellulose, and tricalcium phosphate are preferably used. These dispersion stabilizers may be used alone, or two or more thereof may be used in combination. The amount of the dispersion stabilizer used is, for example, about 0.1 to 60 parts by weight, preferably 0.2 to 30 parts by weight relative to 100 parts by weight of the polymerizable monomer.

The oil soluble radical polymerization initiator is preferably dissolved in the polymerizable monomer beforehand. Illustrative examples of the oil soluble radical initiator include e.g., organic peroxides such as benzoyl peroxide, o-methoxybenzoyl peroxide, o-chlorobenzoyl peroxide, lauroyl peroxide and cumene hydroperoxide, azo-based compounds such as 2,2'-azobisisobutyronitrile and 2,2'-azobis-2,4-dimethylvaleronitrile, and the like. Among these radical polymerization initiators, benzoyl peroxide, lauroyl peroxide, 2,2'-azobisisobutyronitrile and the like are preferably used. These radical polymerization initiators may be used alone, or two or more thereof may be used in combination. The amount of the radical polymerization initiator used is, for example, about 0.1 to 5 parts by weight, preferably 0.1 to 2 parts by weight relative to 100 parts by weight of the polymerizable monomer.

Furthermore, for the sake of dispersion stabilization of droplets of the polymerizable monomer, a surfactant may be added as needed. As the surfactant which may be used, for example, anionic surfactants such as sodium dodecylbenzenesulfonate, sodium dialkylsulfosuccinate and sodium laurylsulfate, nonionic surfactants such as polyethylene glycol-nonylphenyl ether, and the like may be exemplified. These surfactants may be used alone, or two or more thereof may be used in combination. The amount of the surfactant used is, for example, about 0.05 to 2 parts by weight relative to 100 parts by weight of the polymerizable monomer.

If necessary, an inhibitor of aqueous phase polymerization such as, for example, sodium nitrite, etc., may be added.

As a method for generating polymer particles by suspension polymerization, a method in which monomer oil droplets are regulated to have a desired size according to a shearing force by stirring the mixture of the polymerizable monomer, the dispersion stabilizer, the oil soluble radical polymerization initiator and ion exchanged water, prior to initiation of the reaction is preferred.

In this case, for forming fine monomer oil droplets of not exceeding 30 μm, various types of dispersion means such as a homomixer, homodisperser, homogenizer, and line mixer may be preferably used. The size of the monomer oil droplets can be adjusted by regulating the shearing force depending on the revolution speed or the like of the dispersion means.

The temperature of the monomer oil droplets (polymerizable monomer dispersion liquid) prepared in this manner is usually elevated to a 10-hrs half-life period temperature of the radical polymerization initiator, and a polymerization reaction is carried out to obtain a polymer particle suspension. For example, the radical polymerization is carried out by elevating the temperature to not lower than 55° C. when lauroyl peroxide is used as the radical initiator, and to not lower than 65° C. when 2,2'-azobisisobutyronitrile is used.

The fluorine-containing alkyl(meth)acrylate polymer obtained by polymerization is used after recovery as powder (fine particles) from the polymerization reaction mixture by a common operation. More specifically, a method in which centrifugal separation is carried out after allowing for aggregation by salt precipitation or freezing, or a method including spray drying, or the like may be employed.

As the fluorine-containing alkyl(meth)acrylate polymer component, a fluorine-containing alkyl(meth)acrylate copolymer prepared by copolymerization of a fluorine-containing alkyl(meth)acrylate with an other copolymerizable monomer species may be used. Examples of the copolymerizable monomer species include e.g., monomer species of the aforementioned fluorine-containing alkyl(meth)acrylate polymer, methacrylic acid esters such as methyl methacrylate, ethyl methacrylate, propyl methacrylate, n-butyl methacrylate, isobutyl methacrylate and t-butyl methacrylate, acrylic acid esters such as methyl acrylate, ethyl acrylate, propyl acrylate, n-butyl acrylate, isobutyl acrylate and t-butyl methacrylate, halogenated vinyls such as vinyl chloride and vinyl bromide, vinyl cyanide such as acrylonitrile and methacrylonitrile, vinyl esters such as vinyl formate, vinyl acetate and vinyl propionate, aromatic vinyl derivatives such as styrene, vinyltoluene and α-methylstyrene, halogenated vinylidenes such as vinylidene chloride and vinylidene fluoride, acrylic acid and salts thereof such as acrylic acid, sodium acrylate and calcium acrylate, acrylic acid alkyl ester derivatives such as β-hydroxyethyl acrylate, dimethylaminoethyl acrylate, glycidyl acrylate, acrylamide, N-methylolacrylamide, methacrylic acid and salts thereof such as methacrylic acid, sodium methacrylate and calcium methacrylate, methacrylic acid alkyl ester derivatives such as methacrylamide, β-hydroxyethyl methacrylate, dimethylaminoethyl methacrylate and glycidyl methacrylate, and the like. Two or more of these monomers may be used in combination.

Among these, acrylic acid esters are preferred in light of the weather resistance, heat resistance and transparency, and acrylic acid alkyl esters are more preferred. In particular, those in which the alkyl group has 1 to 12 carbon atoms are preferred, and the alkyl group may be either linear or branched.

The fluorine-containing alkyl(meth)acrylate copolymer may be formed from a composition containing 80 to 99.9% by weight of a fluorine-containing alkyl(meth)acrylate and 0.1 to 20% by weight of the other copolymerizable monomer species in light of the transparency, heat resistance, formability, and adhesion properties with the lamination target. More preferably, the composition may contain 90 to 99.9% by weight of the fluorine-containing alkyl(meth)acrylate and 0.1 to 10% by weight of the other copolymerizable monomer species. By containing the other copolymerizable monomer species, preferably acrylic acid ester in an amount of not less than 0.1% by weight, the transparency, heat resistance and adhesion properties can be improved. When the fluorine-containing alkyl(meth)acrylate is contained in an amount of less than 80% by weight, the chemical resistance, and stain resistance are likely to be deteriorated.

The fluorine-containing alkyl(meth)acrylate copolymer may be produced by a similar method to the method for producing the fluorine-containing alkyl(meth)acrylate polymer described above.

The resulting fine particles of fluorine-containing alkyl (meth)acrylate (co)polymer (hereinafter, may referred to as "fluorine-based polymer fine particles") have a mean particle size of preferably 0.5 to 200 μm, and more preferably 1 to 100 μm.

The mean particle size of the fluorine-based polymer fine particles in the present invention is a measurement determined using Microtrac Particle Size Distribution Measuring analyzer MT3000 manufactured by Nikkiso Co., Ltd., in a latex state according to a light scattering method.

Although the shape of the fluorine-based polymer fine particles is not particularly limited, the particles are preferably spherical, spheroid or the like.

The fluorine-containing alkyl(meth)acrylate (co)polymer may be used either alone or in combination of two or more.

The fluorinated (meth)acrylic resin (B) may contain a well-known fluorinated (meth)acrylic resin.

The melt viscosity of the fluorinated (meth)acrylic resin (B) is preferably 300 to 4,000 Pa·sec, more preferably 300 to 3,000 Pa·sec, and still more preferably 300 to 2,000 Pa·sec. When the melt viscosity of the fluorinated (meth) acrylic resin (B) is less than 300 Pa·sec, the resin is less likely to be developed uniformly in the widthwise direction. When the melt viscosity is greater than 4,000 Pa·sec, it is difficult to develop uniformly in the flow direction, and film-thinning may be also difficult, whereby irregularity is generated on the interface with the acrylic resin (A) layer, and thus adhesion failure and inferior appearance of die line etc., are likely to occur.

This melt viscosity (Pa·sec) is a measurement determined according to JIS K7199 using a melt viscosity measuring apparatus (manufactured by Toyo Seiki Seisaku-sho, Ltd., Capilograph 1D), under conditions involving a die temperature of 220° C., a shear rate of 122 $S^{-1}$ and a capillary die diameter of 1 mm.

To the fluororesin (C) may be added (A) an acrylic resin as described later in light of the weather resistance (particularly ultraviolet-ray protective performance), cost, formability and adhesion properties with the lamination target.

In order to impart an aesthetic quality, a well-known light diffusing agent may be added to the fluororesin (C). The light diffusing agent is preferably crosslinked polymer particles of a fluorine-containing alkyl(meth)acrylate polymer as well as crosslinked polymer particles of an acrylic resin described later, particularly an acrylic acid ester or a methacrylic acid ester in light of the dispersibility.

The fluororesin (C) may contain polyvinylidene fluoride in light of the heat resistance. As the polyvinylidene fluoride, any well-known polyvinylidene fluoride may be used. The content of polyvinylidene fluoride is preferably 0.1 to 10 parts by weight, and more preferably 0.5 to 10 parts by weight relative to 100 parts by weight of the fluorinated (meth)acrylic resin (B) in light of the transparency.

To the fluororesin may be added: an inorganic pigment or organic dye for coloring; an anti-oxidizing agent, a heat stabilizer, an ultraviolet-ray absorbing agent, an ultraviolet-ray stabilizer and the like for further improving stability for heat and light; an acrylic matting agent as well as a filler such as mica or glass for imparting an aesthetic quality; or an antibacterial agent, a deodorizer, a lubricant or the like. These may be added alone or in combination of two or more thereof.

The fluororesin film can be produced by a common method, and the method in which melt extrusion of the material from a T die, etc., attached to a tip of an extruder to produce a form of a film is exemplified. The extruder employed may be either a single-screw extruder, or a twin-screw extruder. However, when a twin-screw extruder is used, it is preferred to feed a raw resin using a metering feeder for controlling the amount discharged. In light of control of the pressure applied against the resin, and the accuracy of film formation, the resin is preferably extruded via a gear pump provided between the extruder and the die.

In light of the formability, and transparency, the fluororesin film of the present invention has a thickness of preferably 30 to 300 μm, and more preferably 30 to 200 μm.

The fluororesin-laminated acrylic resin film of the present invention is produced by laminating a film layer of (C) a fluororesin containing (B) a fluorinated (meth)acrylic resin that contains a fluorine-containing alkyl(meth)acrylate polymer component on at least one face of a film layer constituted with (A) an acrylic resin. The fluororesin-laminated acrylic resin film of the present invention can exhibit well balanced transparency, surface hardness, chemical resistance, and stain resistance while taking advantage of superior characteristics of the acrylic resin (A).

A well-known acrylic resin may be used as the acrylic resin (A). A resin composition constituted with (a-1) an acrylic elastic material graft copolymer is preferred in light of superior flex cracking resistance, flex whitening resistance, whereas a resin composition constituted with (a-1) an acrylic elastic material graft copolymer and (a-2) a methacrylic polymer is preferred in light of superior surface hardness.

As the acrylic resin (A), a mixture may be used which is prepared by mixing (a-1) an acrylic elastic material graft copolymer and an methacrylic polymer (a-2) obtained each by polymerization in the form of latex, powder, beads, pellet or the like.

The acrylic resin (A) which may be used is obtained by producing (a-1) an acrylic graft copolymer followed by successively producing (a-2) a methacrylic polymer in the same reaction vessel.

Preferable acrylic elastic material graft copolymer (a-1) is obtained by copolymerizing (a-1b) a monomer mixture containing 50 to 100% by weight of a methacrylic acid ester and 0 to 50% by weight of an other copolymerizable vinyl-based monomer in the presence of an acrylic acid ester type crosslinked elastic material (crosslinked elastic material including an acrylic acid ester as a principal component).

The acrylic acid ester type crosslinked elastic material which may be preferably used is produced by polymerizing (a-1a) a monomer mixture including an acrylic acid ester and an other copolymerizable vinyl-based monomer as needed, and a polyfunctional monomer having at least two unconjugated double bonds per copolymerizable molecule. The entirety of the monomer and the polyfunctional monomer may be mixed (single step polymerization) for use, or a composition of the monomer and the polyfunctional monomer may be altered to use at least two times in divided compositions (at least two step polymerization).

The acrylic acid ester in the acrylic acid ester type crosslinked elastic material which may be used is preferably an acrylic acid alkyl ester in light of polymerizability and costs, in which the alkyl group preferably has 1 to 12 carbon atoms. Specific examples thereof include e.g., methyl acrylate, ethyl acrylate, propyl acrylate, butyl acrylate, 2-ethylhexyl acrylate, n-octyl acrylate, and the like. These may be used alone, or two or more may be used in combination.

The proportion of the acrylic acid ester in the acrylic acid ester type crosslinked elastic material is preferably 50 to 99.9% by weight, more preferably 70 to 99.9% by weight, and most preferably 80 to 99.9% by weight. When the proportion of the acrylic acid ester is less than 50% by weight, the impact resistance and the tensile elongation at break are reduced, and thus cracks are likely to be generated upon cutting the film.

Examples of the other copolymerizable vinyl-based monomer in the acrylic acid ester type crosslinked elastic material include e.g., methacrylic acid alkyl ester (preferably alkyl group has 1 to 12 carbon atoms, and may be linear or branched) such as methyl methacrylate, ethyl methacrylate, propyl methacrylate, n-butyl methacrylate, isobutyl methacrylate, and t-butyl methacrylate; halogenated vinyl such as vinyl chloride, and vinyl bromide; vinyl cyanide such as acrylonitrile, and methacrylonitrile; vinyl esters such as vinyl formate, vinyl acetate, and vinyl propionate; aromatic vinyl derivatives such as styrene, vinyltoluene, and α-methylstyrene; halogenated vinylidene such as vinylidene chloride, and vinylidene fluoride; acrylic acid and salts thereof such as acrylic acid, sodium acrylate, and calcium acrylate; acrylic acid alkyl ester derivatives such as β-hydroxyethyl acrylate, dimethylaminoethyl acrylate, glycidyl acrylate, acrylamide, and N-methylolacrylamide; methacrylic acid and salts thereof such as methacrylic acid, sodium methacrylate, and calcium methacrylate; methacrylic acid alkyl ester derivatives such as methacrylamide, β-hydroxyethyl methacrylate, dimethylaminoethyl methacrylate, and glycidyl methacrylate. These may be used alone, or two or more may be used in combination. Among these, in light of the weather resistance and transparency, methacrylic acid esters are particularly preferred.

The amount of the other copolymerizable vinyl-based monomer in the acrylic acid ester type crosslinked elastic material is preferably 0 to 49.9% by weight, more preferably 0 to 30% by weight, and most preferably 0 to 20% by weight. When the amount of the other vinyl-based monomer exceeds 49.9% by weight, the impact resistance and the tensile elongation at break are reduced, and thus cracks may be likely to be generated upon cutting the film.

The polyfunctional monomer having at least two unconjugated double bonds per copolymerizable molecule in the acrylic acid ester type crosslinked elastic material may be a compound generally used, and for example, allyl methacrylate, allyl acrylate, triallyl cyanurate, triallyl isocyanurate, diallyl phthalate, diallyl maleate, divinyl adipate, divinylbenzene, ethylene glycol dimethacrylate, diethylene glycol methacrylate, triethylene glycol dimethacrylate, trimethylolpropane trimethacrylate, tetramethylolmethane tetramethacrylate, dipropyleneglycol dimethacrylate and corresponding acrylates thereof may be used. These polyfunctional monomers may be used alone, or two or more thereof may be used in combination.

In addition to the mean particle size of the acrylic acid ester type crosslinked elastic material, the amount of the polyfunctional monomer having at least two unconjugated double bonds per copolymerizable molecule in the acrylic acid ester type crosslinked elastic material significantly affects stress whitening, tensile elongation at break, or transparency.

The amount of the polyfunctional monomer blended in the acrylic acid ester type crosslinked elastic material of the present invention is preferably 0.1 to 10% by weight, and more preferably 1.0 to 4% by weight relative to 100% by weight of the monomer mixture (a-1a). The amount of the polyfunctional monomer to be blended being 0.1 to 10% by weight is preferred in light of the flex cracking resistance and the flex whitening resistance as well as the flow performance of the resin during formation.

The acrylic elastic material graft copolymer (a-1) is preferably a product obtained by copolymerizing (a-1b) a monomer mixture containing 50 to 100% by weight of a methacrylic acid ester and 0 to 50% by weight of an other copolymerizable vinyl-based monomer, in the presence of an acrylic acid ester type crosslinked elastic material, and is more preferably a product obtained by copolymerizing 95 to 15 parts by weight of (a-1b) a monomer mixture containing 50 to 100% by weight of a methacrylic acid alkyl ester and 0 to 50% by weight of an other copolymerizable vinyl-based monomer with at least 1 or more steps, in the presence of 5 to 85 parts by weight of an acrylic acid ester type crosslinked elastic material. Herein, the total amount of the monomer mixture (a-1a) and the monomer mixture (a-1b) should be 100 parts by weight.

The amount of the methacrylic acid alkyl ester blended in the monomer mixture (a-1b) is preferably not less than 80% by weight, more preferably not less than 85% by weight, and still more preferably not less than 90% by weight in light of the hardness and rigidity. The other copolymerizable vinyl-based monomer which may be used is exemplified by those used for the acrylic acid ester type crosslinked elastic material, and acrylic acid alkyl esters in which the alkyl group has 1 to 12 carbon atoms. Specific examples include methyl acrylate, ethyl acrylate, propyl acrylate, n-butyl acrylate, isobutyl acrylate, t-butyl acrylate, 2-ethylhexyl acrylate, n-octyl acrylate, and the like. These monomers may be used alone, or two or more thereof may be used in combination.

In this step, a component (free polymer) to be an ungrafted polymer without being subjected to a graft reaction with the acrylic acid ester type crosslinked elastic material is generated in the monomer mixture (a-1b) (graft copolymerization composition). This component (free polymer) may be used as a part or the entirety of the methacrylic polymer (a-2).

A part of the acrylic elastic material graft copolymer (a-1) (i.e., (a-1a) and grafted (a-1b)] becomes insoluble in methyl ethyl ketone.

The grafting yield with respect to the acrylic acid ester type crosslinked elastic material is preferably 30 to 250%, more preferably 50 to 230%, and still more preferably 70 to 220%. When the grafting yield is less than 30%, the flex whitening resistance may be reduced, the transparency as well as the tensile elongation at break may be reduced, and thus cracks are likely to be generated upon cutting the film. When the grafting yield exceeds 250%, the melt viscosity in film formation may be elevated to result in deterioration of formability of the film.

The method for production of the acrylic elastic material graft copolymer (a-1) is not particularly limited, and a well-known emulsion polymerization method, an emulsification-suspension polymerization method, a suspension polymerization method, a bulk polymerization method or a solution polymerization method may be employed. In particular, an emulsion polymerization method is preferred.

The mean particle size d of the acrylic elastic material graft copolymer (a-1) is preferably greater than 100 nm and not greater than 400 nm, more preferably greater than 100 nm and not greater than 350 nm, and still more preferably greater than 100 nm and not greater than 300 nm. When the acrylic elastic material graft copolymer (a-1) has a mean particle size of not greater than 100 nm, the impact resistance and the flex cracking resistance of the film are likely to be deteriorated. When the mean particle size exceeds 400 nm, the transparency of the film is likely to be lowered.

The mean particle size of the acrylic elastic material graft copolymer (a-1) herein is a value measured using a Microtrac Particle Size Distribution Measuring Analyzer MT3000 manufactured by Nikkiso Co., Ltd. in the latex state with a light scattering method.

Since the mean particle size d (nm) of the acrylic acid ester type crosslinked elastic material in the acrylic resin (A), and the amount w (% by weight) of the polyfunctional monomer used in the acrylic acid ester type crosslinked elastic material have great influences on the stress whitening and tensile elongation at break of the film, or on the transparency, they satisfy a relational expression of preferably: 0.02d≤w≤0.06d, and more preferably: 0.02d≤w≤0.05d. When the amount of the polyfunctional monomer w falls within the above range, advantages such as low likelihood of occurrence of stress whitening, low likelihood of lowering of impact resistance, low likelihood of reduction of tensile elongation at break, low likelihood of generation of in cutting the film, low likelihood of lowering of transparency, and favorable film formability are achieved.

The mean particle size d of the acrylic acid ester type crosslinked elastic material in the acrylic resin (A) is preferably 50 to 200 nm, more preferably 50 to 160 nm, still more preferably 50 to 120 nm, and particularly preferably 60 to 120 nm. The mean particle size d of the acrylic acid ester type crosslinked elastic material being not less than 50 nm is preferred since the impact resistance and the tensile elongation at break are less likely to be deteriorated, and thus cracks are less likely to occur in cutting the film. In contrast, the mean particle size d being not greater than 200 nm is preferred since stress whitening is less likely to occur, transparency, particularly transparency after vacuum formation can be secured (maintenance of transparency before and after heating).

The mean particle size d of the acrylic acid ester type crosslinked elastic material is a value measured on a photograph observed using a transmission electron microscope (manufactured by JEOL Ltd., JEM 1200EX) at an accelerating voltage of 80 kV and at a magnification of ×40,000 after preparing a sample by a freezing super-thin sectioning method from the obtained film.

The reduced viscosity of a methyl ethyl ketone soluble fraction of the acrylic resin (A) is preferably 0.2 to 0.8 dl/g; more preferably 0.2 to 0.7 dl/g, and still more preferably 0.2 to 0.6 dl/g. When the reduced viscosity falls within the above range, the tensile elongation at break of the obtained film is less likely to be reduced, and thus cracks are less likely to occur in cutting the film. In addition, advantages such as favorable formability of the film are achieved.

The reduced viscosity of a methyl ethyl ketone soluble fraction herein is a value determined by dissolving the acrylic resin (A) in methyl ethyl ketone, followed by measuring efflux time of the solution and that of the solvent in a temperature-controlled room at 25° C. using a standard viscosity tube according to ISO1628-1, and calculating with these values and the solution concentration.

The acrylic elastic material graft copolymer (a-1) is more preferably a copolymerization product of the ultraviolet-ray absorbing agent represented by the general formula (1) in light of ultraviolet-ray shielding performance, maintenance rate of the ultraviolet-ray shielding performance, low likelihood of bleeding in formation processing.

[Chemical formula 1]

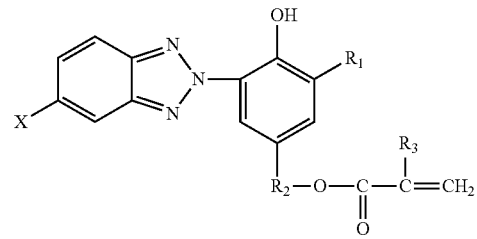

General formula (1)

wherein, X represents H or a halogen atom; $R_1$ represents H, methyl or a t-alkyl group having 4 to 6 carbon atoms; $R_2$ represents a linear or branched alkylene group having 2 to 10 carbon atoms; and $R_3$ represents H or methyl.

The ultraviolet-ray absorbing agent represented by the general formula (1) may include, for example, 2-(2'-hydroxy-5'-methacryloyloxyethylphenyl)-2H-benzotriazoles, including 2-(2'-hydroxy-5'-acryloyloxyethylphenyl)-2H-benzotriazole, 2-(2'-hydroxy-5'-methacryloyloxyethylphenyl)-2H-benzotriazole, 2-(2'-hydroxy-5'-methacryloyloxyethylphenyl)-5-chloro-2H-benzotriazole, 2-(2'-hydroxy-5'-methacryloyloxypropylphenyl)-2H-benzotriazole, 2-(2'-hydroxy-5'-methacryloyloxyethyl-3'-t-butylphenyl)12H-benzotriazole, and the like. Among these, 2-(2'-hydroxy-5'-methacryloyloxyethylphenyl)-2H-benzotriazole is preferred in light of the cost and handling characteristics.

The copolymerization proportion of the ultraviolet-ray absorbing agent represented by the general formula (1) is preferably 0.01 to 30 parts by weight, more preferably 0.01 to 25 parts by weight, still more preferably 0.01 to 20 parts by weight, and particularly preferably 0.05 to 20 parts by weight relative to 100 parts by weight of the acrylic elastic material graft copolymer (a-1). When the copolymerization proportion of the ultraviolet-ray absorbing agent represented by the general formula (1) is less than 0.01 parts by weight, the effect of improving the weather resistance of the obtained film is less likely to be exhibited, whereas when it exceeds 30 parts by weight, the effects of improving the impact resistance and the flex cracking resistance of the obtained film are less likely to be exhibited.

The ultraviolet-ray absorbing agent represented by the general formula (1) may be copolymerized in any layer of the acrylic elastic material graft copolymer (a-1); however, it is preferably copolymerized with the acrylic acid ester type crosslinked elastic material and the methacrylic acid ester-based copolymer (a-1b) and the ultraviolet-ray absorbing agent is more preferably copolymerized uniformly with the entirety of the acrylic elastic material graft copolymer (a-1).

Also, the copolymerization method of the ultraviolet-ray absorbing agent represented by the general formula (1) is not particularly limited, and polymerization carried out during production of the acrylic elastic material graft copolymer (a-1) is preferred.

As an initiator upon polymerization of the acrylic acid ester type crosslinked elastic material, an initiator such as a well-known organic peroxide, inorganic peroxide, or azo compound may be used. Specifically, organic peroxides such as t-butylhydroperoxide, 1,1,3,3-tetramethylbutylhydroperoxide, succinic peroxide, peroxymaleic acid t-butyl ester, cumenehydroperoxide, benzoyl peroxide, formaldehydesulfoxy sodium, reducing sugar, and ascorbic acid, inorganic peroxides such as potassium persulfate, sodium persulfate, and bivalent iron salts, as well as azo compounds such as azobisisobutyronitrile may be also used. These may be used alone, or two or more thereof may be used in combination. These initiators may be used as a common redox type initiator by combining sodium sulfite, sodium thiosulfate, sodium formaldehyde sulfoxylate, ascorbic acid, hydroxyacetonic acid, ferrous sulfate, ferrous sulfate with a reducing agent such as a complex of disodium ethylenediamine tetraacetate.

Of these, in light of polymerization stability and control of the particle size, to use a redox type initiator prepared by combining with inorganic reducing agent such as a bivalent iron salt, and/or an organic reducing agent such as sodium formaldehyde sulfoxylate, reducing sugar, or ascorbic acid is preferred.

The organic peroxide may be added by a well-known method of addition such as a method of adding directly to the polymerization system, a method of addition by mixing with the monomer, and a method of addition by dispersing in an aqueous emulsifying agent solution. In light of the transparency, a method of addition by mixing with the monomer, and a method of addition by dispersing in an aqueous emulsifying agent solution are preferred.

Also, the surfactant used in the emulsion polymerization is not particularly limited, and any general surfactant for emulsion polymerization may be used. For example, anionic surfactants such as sodium alkylsulfonate, sodium alkylbenzenesulfonate, sodium dioctylsulfosuccinate, sodium laurylsulfate, and fatty acid sodium, nonionic surfactants such as alkylphenols, and reaction products of aliphatic alcohols with propylene oxide or ethylene oxide, and the like may be exemplified. These surfactants may be used alone, or two or more thereof may be used in combination. Furthermore, a cationic surfactant such as an alkylamine salt may be used as needed.

Thus obtained acrylic elastic material graft copolymer (a-1) latex is subjected to a common operation such as coagulation, washing or drying, or to a treatment such as spray drying, or freeze drying, whereby the resin composition is separated and recovered.

As the methacrylic polymer (a-2), a methacrylic acid ester-based polymer or a copolymer of a methacrylic acid ester with other copolymerizable vinyl-based monomer may be used. Preferably, a copolymerization product of a monomer mixture constituted with 80 to 100% by weight of a methacrylic acid ester, and 0 to 20% by weight of other copolymerizable vinyl-based monomer may be used.

In light of the hardness and rigidity of the obtained film, the amount of the methacrylic acid ester blended is more preferably not less than 85% by weight, and still more preferably not less than 90% by weight.

As the methacrylic acid ester, a methacrylic acid alkyl ester is preferred, and in light of availability with ease, methyl methacrylate is more preferred.

As the other copolymerizable vinyl-based monomer in the methacrylic polymer (a-2), those which may be used in the acrylic elastic material graft copolymer (a-1) may be exemplified. These monomers may be used alone, or two or more thereof may be used in combination.

It is also possible to polymerize the methacrylic polymer (a-2) separately from the acrylic elastic material graft copolymer (a-1). Also in such a case, the polymerization method is not particularly limited, and a well-known emulsion polymerization method, emulsification-suspension polymerization method, suspension polymerization method, bulk polymerization method or solution polymerization method may be employed.

The mean particle size of the methacrylic polymer (a-2) is preferably 100 to 500 µm, and more preferably 100 to 300 µm. When the mean particle size of the methacrylic polymer (a-2) is less than 100 µm, the impact resistance, flex cracking resistance and chemical resistance are likely to be deteriorated, whereas the transparency is likely to be lowered when the mean particle size exceeds 500 µm.

The mean particle size of the methacrylic polymer (a-2) is a value measured using a Microtrac Particle Size Distribution Measuring Analyzer MT3000 manufactured by Nikkiso Co., Ltd. in the latex state with a light scattering method.

As the initiator for polymerization of the methacrylic polymer (a-2), well-known initiators such as organic peroxides, inorganic peroxides and azo compounds which are similar to the initiators for polymerization of the acrylic acid ester type crosslinked elastic material (a-1a) described above may be used. These may be used alone, or two or more thereof may be used in combination.

The organic peroxide may be added by a well-known method of addition such as a method of adding directly to the polymerization system, a method of addition by mixing with the monomer, and a method of addition by dispersing in an aqueous emulsifying agent solution. In light of the transparency, a method of addition by mixing with the monomer is preferred.

As a dispersant which may be used in suspension polymerization, dispersants generally used in suspension polymerization, for example, polymeric dispersants such as polyvinyl alcohols, polyvinylpyrrolidone and polyacrylamide, and water insoluble inorganic salts such as calcium phosphate, hydroxyapatite and magnesium pyrophosphate may be exemplified. When a water insoluble inorganic salt is used, an anionic surfactant such as sodium α-olefinsulfonate or sodium dodecylbenzenesulfonate may be effectively used in combination since dispersion stability increases. In addition, such a dispersant may be added during polymerization once or more times for the purpose of adjusting the particle size of the obtained resin particles.

The content of the acrylic elastic material graft copolymer (a-1) in the acrylic resin (A) is preferably 5 to 100% by weight, more preferably 5 to ·45% by weight, and still more preferably 10 to 30% by weight. In this regard, the total amount of the acrylic elastic material graft copolymer (a-1) and the methacrylic polymer (a-2) is 100% by weight. When the content of the acrylic elastic material graft copolymer (a-1) is not less than 5% by weight, the tensile elongation at break of the obtained film is less likely to be reduced and thus cracks are less likely to occur in cutting the film, and the stress whitening is less likely to occur. When the content is 5 to 45% by weight, the hardness and the rigidity of the obtained film are likely to be favorable.

With respect to the method for production of the fluororesin-laminated acrylic resin film having a film layer of the fluororesin (C) and a film layer of the acrylic resin (A) of the present invention, any general method may be employed, and a dry lamination process, a wet lamination process, a hot melt lamination process, a heat press lamination process, an extrusion lamination process in which lamination is carried out while melt extrusion with a T die or the like to give a film, and a coextrusion process in which melt adhesion is permitted within a die or outside like a multi-slot process may be exemplified. A coextrusion process is most preferred in terms of securement of adhesion properties between the film layer of the fluororesin (C) and the film layer of the acrylic resin (A), and ease in thermal degradation control of the film in production of the multilayer film.

As the coextrusion process, a process of allowing for adhesion in a T die is preferred, and a production equipment preferably used in this case may be exemplified by: a feed block type laminating equipment in which a common monolayer manifold die is used as a T die, and a part (feed block) is provided at the inlet portion thereof for forming a combined flow layer; a multimanifold type laminating equipment in which resins pass a manifold for each layer in the T die to reach a junction, and then discharged from a lip portion; a stack plate type laminating equipment in which the process for forming the layer is similar to that for the multimanifold die, but a plate housing a manifold is provided over the entirety of the die, with the die body being provided with a recessed area for housing the plate, which area having the plate pack laminated with a unit plate inserted therein, and the like.

As an extruder which may be used for the coextrusion process is either a single screw extruder or a twin-screw extruder. However, when a twin-screw extruder is used, a raw resin is preferably supplied using a metering feeder for controlling the discharged amount, it is preferred that the resin is extruded via a gear pump between the extruder and the die, in light of control of the resin pressure, and accuracy of the film formation.

In the coextrusion process, the temperature of the die part, which is disposed at the cylinder of the extruder and the tip of the extruder, is preferably adjusted to 150 to 270° C. when the laminate film is formed. When the preset temperature is lower than 150° C., unmelted resin may be yielded, leading to difficulty in homogenously kneading the resin, whereby the formability is likely to be deteriorated. In contrast, when the temperature is higher than 270° C., the resin temperature is excessively elevated also due to shear heating in the extruder, whereby degradation of the resin is promoted, and thus the quality of the molded article is likely to be inferior.

When the film is formed, by sandwiching the film with a roll or a metal belt as needed, particularly by sandwiching it with a roll or a metal belt heated at a temperature higher than the glass transition temperature, a film that is more superior in the surface smoothness can be also obtained, and modification of the film such as biaxial stretching is also enabled in accordance with the intended use.

The fluororesin-laminated acrylic resin film of the present invention has a total thickness of preferably 30 to 300 μm, and more preferably 30 to 200 μm. When the fluororesin-laminated acrylic resin film has a total thickness of less than 30 μm, processability in forming the film is deteriorated, and wrinkles are likely to be generated in rolling up the film. In contrast, when the total thickness exceeds 300 μm, the transparency of the film is lowered, and further secondary processability is likely to be deteriorated.

The thickness of the film layer of the fluororesin (C) in the fluororesin-laminated acrylic resin film of the present invention is preferably 1 to 30 μm, more preferably 5 to 30 μm, and still more preferably 5 to 20 μm. When the thickness of the film layer of the fluororesin (C) is less than 1 μm, sufficient weather resistance, chemical resistance, and stain resistance are not attained, and also formability is likely to be deteriorated. In contrast, the thickness exceeding 30 μm results in disadvantages in terms of the cost, and coincidentally the transparency of the film is lowered and the formability is deteriorated to result in an inferior appearance such as die line to be more likely to be found.

In the present invention, an adhesion layer in which an appropriate adhesive or an adhesive resin is used may be provided between the film layer of the fluororesin (C) and the film layer of the acrylic resin (A) for the purpose of lamination in the range not to deteriorate the effects of the invention.

As the adhesive or the adhesive resin, a well-known one may be used, and a (meth)acrylic acid alkyl ester based resin, or a copolymer thereof, a styrene-butadiene copolymer, a rubber such as a polyisoprene rubber or a polyisobutylene rubber, a polyvinyl ether-based, silicone-based, maleimide-based or cyano acrylate-based resin, a halogenated vinylidene resin such as vinylidene chloride or vinylidene fluoride, as well as a mixture of any of these with a fluorinated (meth)acrylic resin containing a fluorine-containing alkyl(meth)acrylate polymer component and a (meth)acrylic acid alkyl ester based resin, or the like may be exemplified. In light of the weather resistance and transparency, a (meth)acrylic acid alkyl ester based resin that is a copolymer based on a (meth)acrylic acid alkyl ester monomer as a principal component is preferred. These may be used either alone, or as an adhesive composition after blending with a crosslinking agent and a tackifier.

The (meth)acrylic acid alkyl ester based resin is an alkyl ester of acrylic acid or methacrylic acid and not particularly limited, but for example, ethyl acrylate, isopropyl acrylate, n-butyl acrylate, isobutyl acrylate, pentyl (meth)acrylate, 2-ethylhexyl(meth)acrylate, isooctyl(meth)acrylate, isononyl(meth)acrylate, decyl(meth)acrylate, lauryl(meth)acrylate, and the like may be exemplified.

A method for providing an adhesion layer which may be used is those similar to the method for formation of the fluororesin-laminated acrylic resin film described above.

Preferable use of the fluororesin film and the fluororesin-laminated acrylic resin film of the present invention is exemplified by use for vehicles, and use for building materials. Specific examples of applicable use include: use in automobile interior decorations such as instrument panels, console box, meter covers, door lock bezels, steering wheels, power window switch bases, center clusters and dashboards; use in automobile exterior decorations such as weather-strips, bumpers, bumper guards, side mud guards, body panels, spoilers, front grills, strut mounts, wheel covers, center pillars, door mirrors, center ornaments, side moldings, door moldings, window moldings, windows, head lamp covers, rear light covers, and windshield parts; use in surface decoration materials such as front panels, buttons and emblem of audio-visual equipments and furniture products; use such as housings, display windows, buttons and the like of mobile phones; as well as use in exterior decoration materials for furnitures; use in architectural interior decoration materials such as wall surfaces, ceilings and floors; use in architectural exterior decoration materials such as outer walls such as sidings, and fences, roofs, gates and barge boards; use in surface decoration materials for furnitures such as window frames, doors, handrail sills and head jambs; use in optical members such as various types of displays, lenses, mirrors, goggles and window glasses; or use in interior and exterior decorations of various types of transportation means other than automobiles such as electric railcars, aircrafts and marine vessels, and the like.

Among the foregoing use, it is preferred that the member surface after completing the laminating has the fluororesin film layer, whereas the adhesion layer with the member corresponds to the film layer of the acrylic resin (A), when laminated on interior and exterior members of vehicles in particular. Although the laminating method is not particularly limited, methods which may be preferably employed include a film in-mold formation method or a film insert formation method, similar to methods described in JP-B Nos. S63-6339 and H04-9647, JP-A Nos. H07-9484, H08-323934 and H10-279766; and the like. More specifically, it is preferred that a film shaped or not shaped beforehand by vacuum formation or the like is inserted between injection formation dies, and the dies are closed in the state with the film sandwiched therebetween to permit mold clamping, whereby injection formation of the substrate resin is executed to allow the film to be melt integrated on the surface of the molded product of the injected substrate resin. In such methods, injection conditions such as resin temperature and injection pressure are predetermined appropriately taking into consideration the type and the like of the substrate resin.

EXAMPLES

Next, the present invention is explained in more detail by way of Examples, but the present invention is not limited only to these Examples.

In the following Production Examples, Examples and Comparative Examples, "part" and "%" represent "part by weight" and "% by weight", respectively.

Note that each measuring methods of the physical properties determined in the following Examples and Comparative Examples are as in the following.

(Particle Size Measuring Method of Acrylic Acid Ester-Based Crosslinked Elastic Material Particles)

A photograph of the obtained film was taken using a transmission electron microscope (manufactured by JEOL, Ltd., JEM-1200EX) at an accelerating voltage of 80 kV, with a $RuO_4$-stained ultrathin sectioning method, and acrylic acid ester type crosslinked elastic material particle images were randomly selected in the number of 100 from the obtained photograph, and an average of the particle size thereof was determined.

(Method for Measuring Particle Size of Fluorinated (Meth)Acrylic Resin (B) and Acrylic Elastic Material Graft Copolymer)

Using Microtrac Particle Size Distribution Measuring Analyzer MT3000 manufactured by Nikkiso Co., Ltd., the particle size was measured in the latex state with a light scattering method.

(Evaluation of Transparency)

For evaluation of the transparency of the obtained film, haze was measured according to JIS K6714, under conditions of a temperature of 23° C.±2° C. and a humidity of 50%±5%.

(Evaluation of Chemical Resistance)
<Xylene Resistance>

One drop (0.02 g) of xylene was placed on the obtained film, and alteration of the film was evaluated by visual observation.
A: no any alteration found;
B: fine trace of drop found; and
C: the surface seriously deteriorated, and trace of drop distinctly found.

(Evaluation of Stain Resistance)
<Resistance to Sunscreens [Resistance to Coppertone (Registered Trademark)] (Test Method 1)>

A small amount of sunscreen (Coppertone Water Babies lotion SPF50) was applied on the obtained film, and gauze was put thereon, followed by applying a load of 500 g. After allowing standing still at a room temperature for 1 hour, the film was heated in an oven at 54° C., 64° C. or 74° C. for 1 hour. Thereafter, the attached sunscreen was wiped off with gauze, and the film was washed with water, followed by visual observation of alteration of the applied portion.
A: no alteration found;
B: fine trace of application found; and
C: the surface seriously deteriorated, and trace of application distinctly found.

<Sunscreen Resistance [Resistance to Coppertone (Registered Trademark)] (Test Method 2)>

One drop (0.005 g) of sunscreen (Coppertone Water Babies lotion SPF50) was placed on the obtained film, and spread to a region of 2×3 cm using a brush. After allowing standing at 70° C., 80° C. or 90° C. for 24 hrs, the attached sunscreen was wiped off with gauze, and the film was washed with water, followed by visual observation of alteration of the applied portion.
A: no alteration found;
B: fine trace of application found; and
C: the surface seriously deteriorated, and trace of application distinctly found.

<Evaluation of Lactic Acid Resistance>

One drop of a 10% aqueous lactic acid solution was placed on the obtained film, which was left to stand under a condition of a temperature of 80° C. for 24 hrs. Thereafter, the film was washed with water, and alteration of the film was evaluated by visual observation.
A: no any alteration found;
B: fine trace of dissolution with a pinhole pattern found; and
C: the surface seriously deteriorated, and trace of dissolution distinctly found.

(Evaluation of Flex Cracking Resistance)

The obtained film was folded once by 180°, and alteration at the folded part was evaluated by visual observation.
A: no breakage found;
B: breakage slightly generated; and
C: film broken, and completely disrupted.

(Evaluation of Flex Whitening Resistance)

The obtained film was folded once by 180°, and alteration at the folded part was evaluated by visual observation.
A: no whitening found;
B: whitening slightly found when light was transmitted; and
C: whitening found.

(Evaluation of Surface Hardness)

The surface hardness of the obtained film was evaluated by measuring the pencil hardness according to JIS K5600-5-4.

(Evaluation of Formability)
<Evaluation of Continuous Formability of Film: (Evaluation Method 1)>

Film formation was continuously carried out for 2 hrs, and the operation status thereof was observed to evaluate according to the following criteria.
A: film thickness being uniform, and film formation enabled without disruption; and
C: film thickness being nonuniform, or film disruption occurred.

<Evaluation of Laminate Film Formability: (Evaluation Method 2)>

Laminate film formation was performed, and the appearance was observed to evaluate according to the following criteria.
A: forming a uniform layer of the surface resin, not accompanied by generation of uneven interface due to melt fracture.
C: forming a nonuniform layer of the surface resin, accompanied by generation of uneven interface due to melt fracture.

(Evaluation of Heat Resistance)
<Evaluation of Heat Aging Resistance>
The obtained film was left to stand in a thermoregulated bath at 80° C. for 168 hrs, and the state of the film was evaluated by visual observation. In addition, with respect to the transparency, haze was measured according to JIS K6714, under conditions of a temperature of 23° C.±2° C. and a humidity of 50%±5%.
A: no any alteration found;
B: deformation of the film due to heat slightly found; and
C: whitening, or surface roughness or deformation due to heat of the film occurred.

Production Example 1 Fluororesin (C-1)

<Fluorine-Containing Alkyl (Meth)Acrylate Polymer (b-1)>
Into a dispersion vessel were placed 300 parts of deionized water, and 2 parts of polyvinyl alcohol. Separately, a monomer solution containing 95 parts of 2,2,2-trifluoroethyl methacrylate, 5 parts of ethylene glycol dimethacrylate and 1 part of lauryl peroxide was prepared, and added to the dispersion vessel. The resulting liquid mixture was subjected to a dispersion treatment using a homomixer to obtain a dispersion liquid having a droplet diameter adjusted to 100 nm.
This dispersion liquid was charged into an 8-L polymerization reaction vessel equipped with a stirrer, a thermometer, a reflux condenser and a nitrogen feeding port. The polymerization reaction was allowed at a liquid temperature of 80 to 90° C. for 3 hrs while stirring the mixture under a nitrogen air flow at 70° C.
Thus resulting dispersion liquid of polymer particles was filtered, followed by washing and drying to obtain spherical organic fine particle powder of poly(2,2,2-trifluoroethyl methacrylate) having a mean particle size of 100 μm as a fluorine-containing alkyl(meth)acrylate polymer (b-1).
<Fluororesin (C-1)>
Melt kneading was carried out using the fluorine-containing alkyl(meth)acrylate polymer (b-1) obtained by the aforementioned method with a 40 mmφ single screw extruder (manufactured by Osaka Seiki Kousaku K. K.) regulated to have a cylinder temperature of 200° C., a Screw rotation speed of 75 rpm, a discharge rate of 10 kg/hour, and took up in a strand form. After cooling in a water bath, a resin pellet (C-1) of the fluororesin was produced by cutting the strand using a pelletizing machine.

Production Example 2 Fluororesin (C-2)

A resin pellet (C-2) of a fluororesin was produced by a similar operation to Production Example 1 except that the obtained fluorine-containing alkyl(meth)acrylate polymer (b-1) was used as the fluororesin, and the melt kneading condition was changed to a cylinder temperature of 200 to 240° C., a screw rotation speed of 125 rpm and a discharge rate of 15 kg/hour.

Production Example 3 Acrylic Resin (A-1)

<Acrylic Elastic Material Graft Copolymer (a1-1)>
An 8-L polymerization apparatus equipped with a stirrer was charged with the following materials.
 deionized water: 200 parts
 sodium dioctylsulfosuccinate: 0.25 parts
 sodium formaldehyde sulfoxylate: 0.15 parts
 ethylene diamine tetraacetic acid-2-sodium: 0.001 parts
 ferrous sulfate: 0.00025 parts After sufficiently filling the polymerizer with a nitrogen gas to give a substantially oxygen-free state, the internal temperature was adjusted to 60° C., and a mixture containing 30 parts by weight of the monomer mixture (a1-1a) described below and 0.5 parts of 2-(2'-hydroxy-5'-methacryloyloxyethylphenyl)-2-H-benzotriazole (manufactured by Otsuka Chemical Co., Ltd., RUVA-93) was continuously added thereto at a rate of 10 parts by weight/hour. After completing the addition, polymerization was continued for additional 0.5 hrs to obtain acrylic acid ester type crosslinked elastic material particles (mean particle size d=60 nm), with a polymerization conversion rate of 99.5%.
Monomer mixture (a1-1a):
 vinyl-based monomer mixture (butyl acrylate (BA): 90%, and methyl methacrylate (MMA): 10%): 100 parts
 allyl methacrylate (AlMA): 1 part
 cumenehydroperoxide (CHP): 0.2 parts
Thereafter, 0.05 parts by weight of sodium dioctylsulfosuccinate was charged, and then the internal temperature was adjusted to 60° C. Thereto was added continuously 70 parts of a monomer mixture (a1-1b) containing 100 parts of a vinyl-based monomer mixture (BA: 10% and MMA: 90%), 0.5 parts of tert-dodecyl mercaptan (t-DM) and 0.5 parts of CHP at a rate of 10 parts/hour. Polymerization was continued for additional 1 hour to obtain an acrylic elastic graft copolymer (a1-1) (mean particle size=180 μm), with a polymerization conversion rate of 98.2%. Thus resulting latex was subjected to salt precipitation with calcium chloride and coagulation, followed by washing with water and drying to obtain resin powder (a1-1).
<Methacrylic Polymer (a1-2)>
As a methacrylic polymer (a1-2), a methyl methacrylate/methyl acrylate copolymer (manufactured by Sumitomo Chemical Co., Ltd., SUMIPEX LG, beads matter) was used.
<Acrylic Resin (A-1)>
After mixing 70 parts of the acrylic elastic material graft copolymer (a1-1) obtained as described above and 30 parts of the methacrylic polymer (a1-2) using a Henschel mixer, melt kneading was carried out with a 40 mmφ single screw extruder (manufactured by Osaka Seiki Kousaku K. K.) regulated to have a cylinder temperature of 200° C. to 260° C., a screw rotation speed of 90 rpm, a discharge rate of 15 kg/hour, and took up in a strand form. After cooling in a water bath, a resin pellet (A-1) of the acrylic resin was produced by cutting the strand using a pelletizing machine.

Production Example 4 Fluororesin (C-3)

A resin pellet (C-3) of a fluororesin was produced by a similar operation to Production Example 2 except that a mixture of 80 parts of the fluorine-containing alkyl(meth)acrylate polymer (b-1) obtained in Production Example 1, and 20 parts of the acrylic elastic material graft copolymer obtained in Production Example 2 was used as the fluororesin.

Production Example 5 Acrylic Resin (A-2)

<Acrylic Elastic Material Graft Copolymer (a2-1)>
An 8-L polymerization apparatus equipped with a stirrer, thermometer, nitrogen gas inlet tube, monomer supplying tube and a reflux condenser was charged with the following materials.
 water (ion exchanged water): 200 parts
 sodium formaldehyde sulfoxylate: 0.15 parts
 ferrous sulfate dihydrate: 0.0015 parts
 ethylene diamine tetraacetic acid-2-sodium: 0.006 parts
 sodium dioctylsulfosuccinate: 0.0015 parts
After sufficiently filling the polymerizer with a nitrogen gas to give a substantially oxygen-free state, the internal temperature was adjusted to 60° C., and 50 parts of a monomer mixture (a2-1a) containing 100 parts of a vinyl-based monomer mixture (BA: 84%, MMA: 8% and styrene (ST): 8%), 1 part of AlMA and 0.1 parts of CHP was continuously added thereto at a rate of 15 parts/hour. After completing the addition, polymerization was continued for additional 1 hour to obtain acrylic acid ester type crosslinked elastic material particles (a2-1a) (mean particle size d=210 nm), with a polymerization conversion rate of 98.5%.

Thereafter, 0.05 parts of sodium dioctylsulfosuccinate was charged, and then the internal temperature was adjusted to 60° C. Thereto was added continuously 50 parts of a monomer mixture (a2-1b) containing 100 parts of a vinyl-based monomer mixture (MMA: 90% and BA: 10%), 0.2 parts of t-DM and 0.1 parts of CHP at a rate of 10 parts/hour. Polymerization was continued for additional 1 hour to obtain an acrylic elastic graft copolymer (a2-1) (mean particle size=200 μm), with a polymerization conversion rate of 99.0%. Thus resulting latex was subjected to salt precipitation with calcium chloride and coagulation, followed by washing with water and drying to obtain resin powder (a2-1).

<Methacrylic Polymer (a2-2)>

As a methacrylic polymer (a2-2), a methyl methacrylate/methyl acrylate copolymer (manufactured by Sumitomo Chemical Co., Ltd., SUMIPEX EX, beads matter) was used.

<Acrylic Resin (A-2)>

A resin pellet (A-2) of an acrylic resin was produced similarly to Production Example 2 except that after mixing 25 parts of the acrylic elastic material graft copolymer (a2-1) obtained as described above and 75 parts of a methacrylic polymer (a2-2), and 1.0 part of Tinuvin 234 (manufactured by Ciba Japan K.K.) as an ultraviolet-ray absorbing agent using a Henschel mixer, the cylinder temperature was adjusted to a temperature of 240° C.

Comparative Production Example 1 Fluororesin (C-4)

A resin pellet (C-4) of a fluororesin was produced by a similar process to Production Example 2 except that 100 parts of polyvinylidene fluoride (manufactured by SOLVAY S.A., SOLEF-1008) alone was used as the fluororesin, and the cylinder temperature was changed to 260° C.

Comparative Production Example 2 Fluororesin (C-5)

A resin pellet (C-5) of a fluororesin was produced by a similar process to Comparative Production Example 2 except that 100 parts of ethylene-tetrafluoroethylene copolymer (manufactured by Asahi Glass Co., Ltd., Fluon ETFE AH-2000) alone was used as the fluororesin.

Production Example 6 Fluororesin (C-6)

A resin pellet (C-6) of a fluororesin was produced by a similar operation to Production Example 3 except that a mixture of 100 parts of the fluorine-containing alkyl(meth)acrylate polymer (b-1) obtained in Production Example 1 and 10 parts of polyvinylidene fluoride was used as the fluororesin.

Production Example 7 Fluororesin (C-7)

A resin pellet (C-7) of a fluororesin was produced by a similar operation to Production Example 1 except that a mixture of 100 parts of the fluorine-containing alkyl(meth)acrylate polymer (b-1) obtained in Production Example 1 and 0.1 parts of polyvinylidene fluoride was used as the fluororesin.

Production 1 of Fluororesin Monolayer Film

Example 1

The resin pellet (C-1) of the fluororesin obtained in Production Example 1 was subjected to melt kneading using a 40 mmφ single screw extruder equipped with a T die at a cylinder preset temperature of 160 to 220° C. and a discharge rate of 10 kg/hr to obtain at a die temperature of 240° C. a monolayer resin film having a thickness of 125 μm.

The results of evaluation on the obtained film are shown in Table 1.

Example 2

A monolayer resin film having a thickness of 125 μm was obtained by a similar operation to Example 1 except that the resin pellet (C-2) of the fluororesin obtained in Production Example 2 was used, and the cylinder preset temperature of the 40 mmφ single screw extruder equipped with a T die was changed to 180 to 240° C.

The results of evaluation on the obtained film are shown in Table 1.

As shown in Table 1, it is proven that the fluororesin monolayer film of the present invention exhibits well balanced chemical resistance, resistance to lactic acid, stain resistance to sunscreens, transparency, and surface hardness as compared with Comparative Examples 1 and 2.

Comparative Example 1

An acrylic resin monolayer film was obtained by a similar operation to Example 1 except that the resin pellet (A-1) of the acrylic resin obtained in Production Example 2 was used.

The results of evaluation on the obtained film are shown in Table 1.

Comparative Example 2

A fluororesin monolayer film was obtained by a similar operation to Example 1 except that the resin pellet (C-4) of the fluororesin obtained in Comparative Production Example 1 was used.

The results of evaluation on the obtained film are shown in Table 1.

Production 1 of Fluororesin-Laminated Acrylic Resin Film

Example 3

A laminate film having a thickness of 125 μm (base resin layer: 110 μm and surface resin layer: 15 μm) was obtained according to the following coextrusion process using the resin pellet (A-1) of the acrylic resin obtained in Production Example 3 as a base resin, with the resin pellet (C-2) of the fluororesin obtained in Production Example 2 as a surface layer resin.

As the T die used in coextrusion, a two-type two-layer T die (feed block system) was employed. As the extruder on the side of the acrylic resin (A), a 40 mmφ single screw extruder was used, and melt kneading was carried out at a cylinder preset temperature of 200 to 260° C. and a discharge rate of 5 to 15 kg/hr. On the other hand, as the extruder on the side of the fluororesin (C), a 32 mmφ single screw extruder was used, and melt kneading was carried out at a cylinder preset temperature of 180 to 240° C. and a discharge rate of 0.5 to 3 kg/hr. The melted resin was charged into the die having a die temperature preset at 240° C., and thus a laminate film was obtained.

The results of evaluation on the obtained film are shown in Table 1.

Example 4

A laminate film was obtained by a similar operation to Example 3 except that the surface layer resin was changed to the resin pellet (C-3) of the fluororesin obtained in Production Example 4.

The results of evaluation on the obtained film are shown in Table 1.

As shown in Table 1, it is proven that the fluororesin-laminated acrylic film of the present invention exhibits well balanced transparency, chemical resistance, stain resistance to sunscreens, resistance to lactic acid and surface hardness. In particular, it is clear that fluororesin-laminated acrylic film of the present invention has superior effects on the transparency and surface hardness, judging from the comparison with Comparative Example 3. Furthermore, it is also proven that superior flex cracking resistance and flex whitening resistance of acrylic resin monolayer films, as exhibited by Comparative Example 1 are maintained in the fluororesin-laminated acrylic resin film of the present invention.

Example 5

A laminate film was obtained by a similar operation to Example 3 except that the base resin was changed to the resin pellet (A-2) of the acrylic resin obtained in Production Example 5.

The results of evaluation on the obtained film are shown in Table 1.

As shown in Table 1, it is proven that the fluororesin-laminated acrylic resin film of the present invention exhibits superior transparency, surface strength, chemical resistance, and stain resistance even though the acrylic resin (A) was changed.

Comparative Example 3

A laminate film was obtained by a similar operation to Example 3 except that the surface layer resin was changed to the resin pellet (C-4) of the fluororesin obtained in Comparative Production Example 1.

The results of evaluation on the obtained film are shown in Table 1.

Comparative Example 4

A laminate film was obtained by a similar operation to Example 3 except that the surface layer resin was changed to the resin pellet (C-5) of the fluororesin obtained in Comparative Production Example 2.

Evaluation results on the obtained film are shown in Table 1.

TABLE 1

| | | | | | Ex. 1 | Ex. 2 | Ex. 3 | Ex. 4 | Ex. 5 | Compar. Ex. 1 | Compar. Ex. 2 | Compar. Ex. 3 | Compar. Ex. 4 |
|---|---|---|---|---|---|---|---|---|---|---|---|---|---|
| Resin composition (part) | Base resin layer | Acrylic resin (A-1) | | Acrylic resin composition (a1-1) | — | — | 70 | 70 | — | 70 | — | 70 | 70 |
| | | | | Methacrylic polymer (a1-2) | — | — | 30 | 30 | — | 30 | — | 30 | 30 |
| | | Acrylic resin (A-2) | | Acrylic resin composition (a2-1) | — | — | — | — | 25 | — | — | — | — |
| | | | | Methacrylic polymer (a2-2) | — | — | — | — | 75 | — | — | — | — |
| | Surface resin layer | Fluoro resin (C) | Fluorinated (meth)acrylic resin (B) | Acrylic resin composition (a1-1) | — | — | — | 20 | — | — | — | — | — |
| | | | | Fluorine-containing alkyl (meth)acrylate polymer (b-1) | 100 | 100 | 100 | 80 | 100 | — | — | — | — |
| | | | | Polyvinylidene fluoride | — | — | — | — | — | — | 100 | 100 | — |
| | | | | Ethylene-tetrafluoroethylene copolymer | — | — | — | — | — | — | — | — | 100 |
| | Total film thickness (μm) | | | | 125 | 125 | 125 | 125 | 125 | 125 | 125 | 125 | 125 |
| | Film thickness of (C) layer (μm) | | | | — | — | 15 | 15 | 15 | — | — | 15 | 15 |
| Film characteristics | Transparency/haze (%) | | | | 1.2 | 0.6 | 0.6 | 0.6 | 0.7 | 0.4 | 3.2 | 1.5 | 4.7 |
| | Chemical resistance | | | | A | A | A | A | A | A | A | A | A |
| | Sunscreen resistance | (Test Method 1) | 54° C., 2 hrs, 500-g load applied | | A | A | A | A | A | C | A | A | A |
| | | | 64° C., 2 hrs, 500-g load applied | | A | A | A | A | A | C | A | A | A |
| | | | 74° C., 2 hrs, 500-g load applied | | B | B | B | B | B | C | A | A | A |
| | | (Test Method 2) | 70° C., 24 hrs | | A | A | A | A | A | C | A | A | A |
| | | | 80° C., 24 hrs | | A | A | A | A | A | C | A | A | A |
| | | | 90° C., 24 hrs | | A | A | A | A | A | C | A | A | A |
| | Lactic acid resistance | | | | A | A | A | A | A | C | A | A | A |
| | Flex cracking resistance | | | | B | B | A | A | B | A | A | A | A |
| | Flex whitening resistance | | | | B | B | A | A | C | A | C | A | A |
| | Surface hardness | | | | F | F | F | F | F-H | F | 2B | 2B | HB |
| | Formability | (Evaluation Method 1) | | | C | A | A | A | A | A | A | A | C |
| | | (Evaluation Method 2) | | | — | — | A | A | A | — | — | A | C |
| | Heat aging resistance | 80° C., 168 hrs | Visual evaluation | | B | B | B | A | B | A | A | A | A |
| | | | Transparency/haze (%) | | 1.4 | 0.9 | 0.9 | 0.7 | 0.9 | 0.6 | 3.2 | 1.5 | 5 |

As is shown in Table 1, the fluororesin film of Comparative Example 1 exhibits inferior stain resistance to sunscreens and resistance to lactic acid and the fluororesin film of Comparative Example 2 exhibits inferior transparency and surface hardness. On the other hand, it is clear that the fluororesin monolayer film of the present invention exhibits superior chemical resistance, resistance to lactic acid, stain resistance to sunscreens, surface hardness, and transparency.

In addition, the fluororesin-laminated acrylic resin films of Comparative Examples 3 and 4 exhibit inferior transparency and surface hardness. On the other hand, it is clear that the fluororesin-laminated acrylic resin film of the present invention exhibits superior surface hardness and transparency, and also exhibits superior chemical resistance, resistance to lactic acid and stain resistance to sunscreens. Moreover, according to the fluororesin-laminated acrylic resin film of the present invention, superior flex cracking resistance and flex whitening resistance of acrylic resin monolayer films are hot deteriorated.

Production 2 of Fluororesin Monolayer Film

Example 6

A fluororesin monolayer film was obtained by a similar operation to Example 2 except that the resin pellet (C-6) of the fluororesin obtained in Production Example 6 was used.

The results of evaluation on the obtained film are shown in Table 2.

As shown in Table 2, it is proven that resistance to sunscreens and heat aging resistance under high-temperature conditions are improved, and the heat resistance is enhanced when polyvinylidene fluoride was added to the fluorinated resin of the present invention. Furthermore, it is also proven that superior transparency can be maintained irrespective of addition of polyvinylidene fluoride.

Production 2 of Fluororesin-Laminated Acrylic Resin Film

Example 7

A laminate film was obtained by a similar operation to Example 3 except that the surface layer resin was changed to the resin pellet (C-6) of the fluororesin obtained in Production Example 6.

The results of evaluation on the obtained film are shown in Table 1.

As shown in Table 2, it is proven that the transparency of the acrylic resin film of Comparative Example 1 can be maintained according to the fluororesin-laminated acrylic film of the present invention, irrespective of addition of polyvinylidene fluoride to the fluorinated resin. Furthermore, it is also proven that the fluororesin-laminated acrylic film of the present invention exhibits well balanced surface hardness, chemical resistance, stain resistance, and heat resistance.

Example 8

A laminate film was obtained by a similar operation to Example 3 except that the surface layer resin was changed to the fluororesin pellet (C-7) obtained in Production Example 7, and that the T die used in coextrusion was changed to a two-type two-layer T die (stack plate system).

The results of evaluation on the obtained film are shown in Table 2.

It is proven that the heat aging resistance was improved even though the content of the polyvinylidene fluoride was 0.1 parts.

Example 9

A laminate film was obtained by a similar operation to Example 3 except that the resin pellet (C-6) of the fluororesin obtained in Production Example 6 was used as the surface layer resin, and that the thickness of the laminate film was changed to 85 μm of the base resin layer plus 40 μm of the surface resin layer.

The results of evaluation on the obtained film are shown in Table 2.

It is revealed that the transparency was maintained without depending on the thickness of the surface layer (fluororesin film layer), and well balanced surface hardness, chemical resistance, stain resistance and heat resistance were achieved.

TABLE 2

| | | | | | Ex. 6 | Ex. 7 | Ex. 8 | Ex. 9 |
|---|---|---|---|---|---|---|---|---|
| Resin composition (part) | Base resin layer | Acrylic resin (A-1) | | Acrylic resin composition (a1-1) | — | 70 | 70 | 70 |
| | | | | Methacrylic polymer (a1-2) | — | 30 | 30 | 30 |
| | | Acrylic resin (A-2) | | Acrylic resin composition (a2-1) | — | — | — | — |
| | | | | Methacrylic polymer (a2-2) | — | — | — | — |
| | Surface resin layer | Fluororesin (C) | Fluorinated (meth)acrylic resin (B) | Acrylic resin composition (a1-1) | — | — | — | — |
| | | | | Fluorine-containing alkyl (meth)acrylate polymer (b-1) | 100 | 100 | 100 | 100 |
| | | | | Polyvinylidene fluoride | 10 | 10 | 0.1 | 10 |
| Total film thickness (μm) | | | | | 125 | 125 | 125 | 125 |
| Film thickness of (C) layer (μm) | | | | | — | 15 | 15 | 40 |

TABLE 2-continued

|  |  |  |  | Ex. 6 | Ex. 7 | Ex. 8 | Ex. 9 |
|---|---|---|---|---|---|---|---|
| Film characteristics | Transparency/haze (%) |  |  | 0.5 | 0.7 | 0.7 | 0.7 |
|  | Chemical resistance |  |  | A | A | A | A |
|  | Sunscreen resistance | (Test Method 1) | 54° C., 2 hrs, 500-g load applied | A | A | A | A |
|  |  |  | 64° C., 2 hrs, 500-g load applied | A | A | A | A |
|  |  |  | 74° C., 2 hrs, 500-g load applied | A | A | A | A |
|  |  | (Test Method 2) | 70° C., 24 hrs | A | A | A | A |
|  |  |  | 80° C., 24 hrs | A | A | A | A |
|  |  |  | 90° C., 24 hrs | A | A | A | A |
|  | Lactic acid resistance |  |  | A | A | A | A |
|  | Flex cracking resistance |  |  | A | A | A | A |
|  | Flex whitening resistance |  |  | B | A | A | B |
|  | Surface hardness |  |  | F | F | F | F |
|  | Formability | (Evaluation Method 1) |  | A | A | A | A |
|  |  | (Evaluation Method 2) |  | — | A | A | C |
|  | Heat aging resistance | 80° C., 168 hrs | Visual evaluation | A | A | A | A |
|  |  |  | Transparency/haze (%) | 0.6 | 0.7 | 0.8 | 0.9 |

It is reveled from the results shown in Table 2 that when the fluororesin of the present invention contains polyvinylidene fluoride, it exhibits superior resistance to sunscreens at high temperatures, and the elevation rate of the haze in the heat aging resistance decreased accompanied by well balanced heat resistance, while maintaining superior surface hardness F and transparency, i.e., the haze of 0.5 to 0.7%. Therefore, the fluororesin-laminated acrylic resin film of the present invention can be applied also to interior and exterior members of vehicles that need high surface hardness and transparency, i.e., the haze of not greater than 1%.

As in the foregoing, the fluororesin-laminated acrylic resin film according to the present invention has superior stain resistance such as resistance to sunscreens and resistance to lactic acid, while maintaining superior characteristics of acrylic resins such as superior transparency, flex cracking resistance, flex whitening resistance and surface hardness. In addition, when polyvinylidene fluoride is contained in the fluororesin (C) of the present invention, heat resistance can be improved while having high transparency. Therefore, the fluororesin-laminated acrylic resin film of the present invention can be applied also to interior and exterior members of vehicles that need to satisfy strict standards with regard to these characteristics.

The invention claimed is:

1. A fluororesin film formed with
    (C) a fluororesin comprising
    (B) a fluorinated (meth)acrylic resin that contains a fluorine-containing alkyl (meth)acrylate polymer component, wherein said fluorine atom is bonded directly to said alkyl group,
    wherein the fluororesin (C) comprises polyvinylidene fluoride in a content of 0.1 to 10 parts by weight relative to 100 parts by weight of the fluorinated (meth)acrylic resin (B);
    wherein the fluororesin film has a thickness of 30-300 μm and
    wherein the fluorine-containing alkyl (meth)acrylate polymer is a copolymer of 90 to 99.9% by weight of a fluorine-containing alkyl (meth)acrylate and 0.1 to 10% by weight of another copolymerizable monomer.

2. The fluororesin film according to claim 1, wherein the content of the fluorine-containing alkyl (meth)acrylate polymer component is not less than 80% by weight relative to 100% by weight of the fluorinated (meth)acrylic resin (B).

3. A molded article produced by laminating the fluororesin film according to claim 1.

4. The fluororesin film according to claim 1, wherein the fluororesin film is produced by melt extrusion.

5. The fluororesin film according to claim 1, wherein the fluororesin film is a monolayer.

6. The fluororesin film according to claim 1, wherein the copolymerizable monomer is at least one selected from the group consisting of methacrylic acid esters, acrylic acid esters, halogenated vinyls, vinyl cyanide, vinyl esters, aromatic vinyl derivatives, halogenated vinylidenes, acrylic acid and salts thereof, acrylic acid alkyl ester derivatives, methacrylic acid and salts thereof, methacrylic acid alkyl ester derivatives, and ethylene glycol dimethacrylate.

* * * * *